United States Patent Office 3,327,126
Patented June 20, 1967

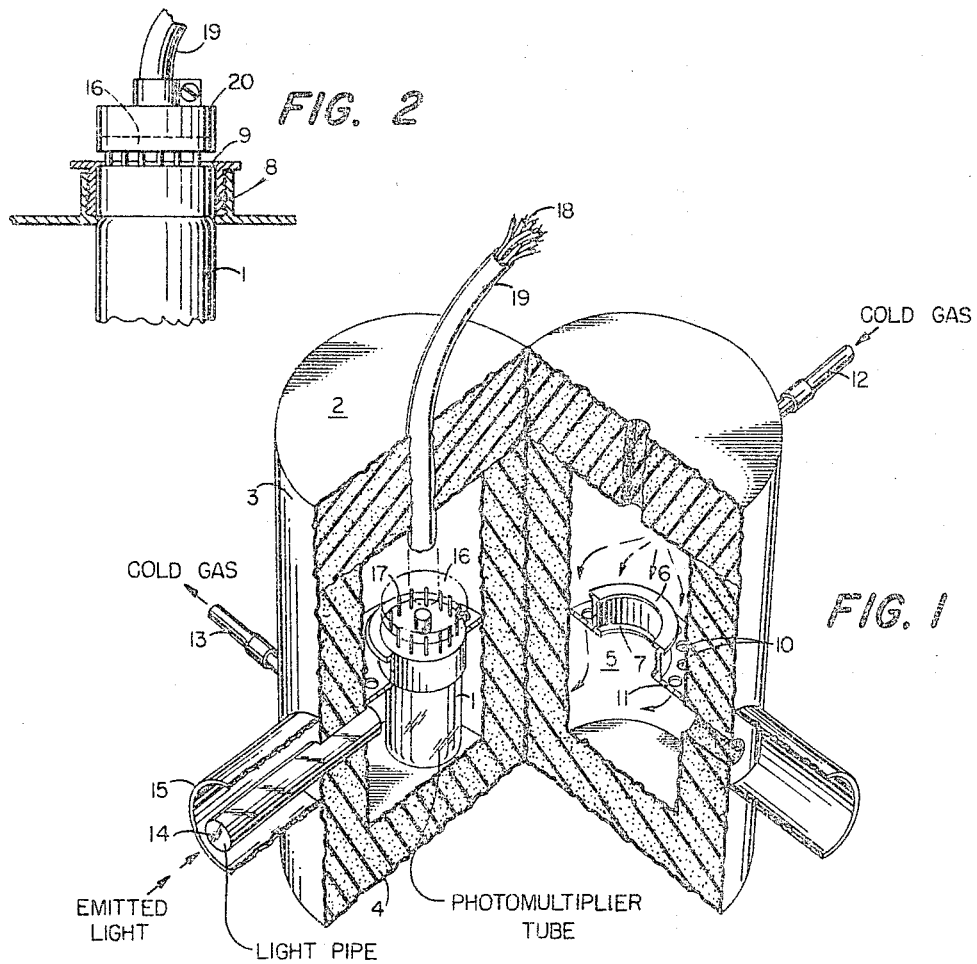
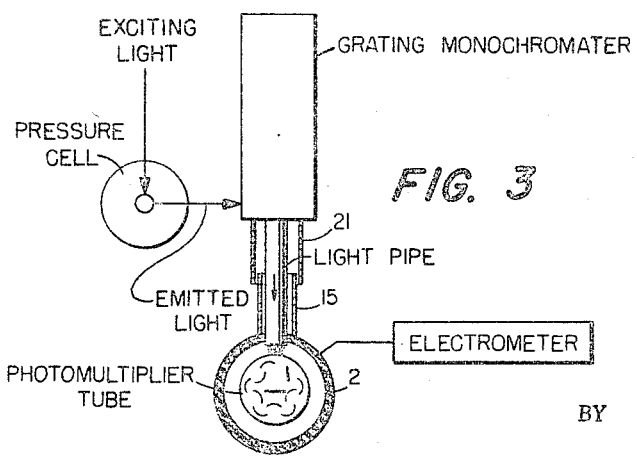

3,327,126
EMISSION SPECTROMETER WITH COOLED
PHOTOMULTIPLIER TUBE DETECTOR
Paul E. V. Shannon, Oxon Hill, Md., and Perry B. Alers, Washington, D.C., assignors to the United States of America as represented by the Secretary of the Navy
Filed Feb. 28, 1964, Ser. No. 348,914
6 Claims. (Cl. 250—238)

The invention described herein may be manufactured and used by or for the Government of the United States of America for governmental purposes without the payment of any royalties thereon or therefor.

This invention relates to an improved emission spectrometer using a photomultiplier tube as detector of the incident light.

Photomultiplier tubes develop dark current in operation which interferes with measurement of the signal current derived from the incident light. When the dark current is of the same order of magnitude as the signal current of the tube or greater, measurement of the signal current is blocked. Dark current is principally thermionic emission from the photocathode and can be reduced by cooling of the photocathode.

It is an object of the present invention to provide means for measurably reducing the development of dark current in the operation of photomultiplier tubes when used as the detector in emission spectrometers. It is also an object to provide an improved emission spectrometer. It is also an object to provide an improved emission spectrometer using a photomultiplier tube as the detector which can be operated to measure signal currents of very low orders of magnitude.

The above and other objects are accomplished in the improved emission spectrometer of the present invention which comprises, broadly stated, an emitted-light section, which normally is operated at room temperature, and a photomultiplier tube section having a cooling chamber in which the photomultiplier tube is operated at low temperatures, and a light pipe between the two sections which extends into the cooling chamber of the photomultiplier tube section and is adapted for efficient transmission of emitted light to the photomultiplier tube.

A feature of the emission spectrometer of the present invention is a frost-free condition of the light transmitting surfaces at low temperature operation of the photomultiplier tube. The light transmitting surfaces are the entrant face of the light pipe and the envelope of the photomultiplier tube. The frost-free condition of the light transmitting surfaces ensures an efficient transmission of very low levels of emitted light to the photomultiplier tube, such as characterize phosphor emissions developed by excitation of the phosphor with light of higher energy. This feature is made possible by the use of a cold dry gas for cooling of the photomultiplier tube and of a light pipe of a length sufficient to cause the temperature gradient or dew point developed therein by reason of operation of the photomultiplier tube at low temperatures to occur at a point which is removed from the entrant face of the light pipe.

The present invention will be more fully understood from the following description when read in conjunction with the accompanying drawing in which like numerals indicate like parts and wherein:

FIG. 1 is a showing, partly in section and partly broken away, of a photomultiplier tube section and arrangement of the light pipe in accordance with the invention.

FIG. 2 is a detail showing of the arrangement of certain parts in the photomultiplier tube section of FIG. 1, and FIG. 3 is a schematic showing of an arrangement of a photomultiplier tube section and light pipe in an emission spectrometer in accordance with the invention.

Referring to FIGURE 1 which illustrates the photomultiplier tube section of the emission spectrometer, a photomultiplier tube 1 is arranged in a thermal-insulating housing, indicated generally at 2. The housing 2 comprises an outer metal shell 3 which encloses a body of sectionalized thermal insulating material 4, suitably foamed polystyrene, and inner metal chamber 5. The shell 3 and the chamber 5 may be a cylindrical metal can in each instance, provided with a lid or cover which forms the top wall and has an opening for passage of a cable therethrough.

The photomultiplier tube 1 is arranged in the metal chamber 5 in spaced relationship to the walls of the chamber, including the top and bottom walls, by means of an annular metal bracket 6 which is affixed to the side walls of the chamber and located at a distance between the top and the bottom of the chamber so as to leave space between the upper and lower ends of the tube and the top and bottom walls of the chamber for movement of the cooling gas in the chamber about the tube. The photomultiplier tube is held from upward movement in the bracket 6 by an arrangement of known construction as shown in FIGURE 2 in which a threaded metal sleeve 8 having an inner annular lip 9 is fitted down over the base of the tube when the latter is in position in the bracket. A series of perforations 10 are provided in the base flange 11 of the annular bracket 6 to allow flow of the cooling gas to the lower portion of the chamber 5.

A metal inlet tube 12 and a metal outlet tube 13 extends in close fit through the housing 2 to communicate with the cooling chamber 5 for entry of the cooling gas at the upper portion of the chamber and exit of the same at the lower portion of the chamber, as shown. These tubes are preferably made of a metal which will tend to hold heat leakage to a minimum, such as the commercial nickel base alloy known as Inconel.

A light pipe 14 arranged for transmission of emitted light to the photomultiplier tube passes in close fit through the housing 2 and terminates in the cooling chamber 5, preferably at a point short of the line of the perforations 10 in the flange of the annular bracket 6 so as to avoid interference with the flow of the cooling gas in the chamber. A metal tube 15 affixed to the metal shell 3 serves to shield the light pipe from ambient light and afford a measure of protection thereto against mechanical damage.

The photomultiplier tube, in operative position in the spectrometer to receive emitted light by way of the light pipe, is electrically connected in known way to means for measuring the signal current of the tube and to a suitable voltage source, using electrical connecting parts of conventional design. As shown, an insulating pin-type socket plate 16 is used for making electrical connection between the tube pins, indicated generally at 17, and the respective lead wires, indicated generally at 18, to the voltage source and the means for measuring the signal current of the tube. The lead wires are used in the form of a cable having a sheathing 19 of water-resistant, low heat-conductive material, such as rubber or polychloroprene (Neoprene). Cable of this kind is commercially available. The cable with the sheathing 19 thereon passes through the housing 2 in friction-fit and extends into the cooling chamber 5 to the point of connection of the lead wires with the pin sockets of the plate 16. Retention of the sheathing on the cable in the cooling chamber 5 serves to reduce heat leakage into the chamber by conduction through the lead wires.

Cooling of the electrodes of the photomultiplier tube to low operating temperatures is accomplished following the present invention by exposing a portion of the metal of each of the terminal pins of the tube to direct contact with a stream of cold dry gas. This mode of cooling of the electrodes in the evacuated envelope of the tube employs the respective metal electrical conductive paths between the terminal pins and the electrodes as heat transfer paths. It is not possible, as a practical matter, to effect cooling of the electrodes in the evacuated envelope of the photomultiplier tube to low operating temperatures by direct heat transfer through the envelope to a cooling fluid, since, as is well known, a vacuum is a poor heat transfer medium.

FIGURE 2 illustrates in somewhat greater dimensions an arrangement as shown in FIGURE 1 for effecting cooling of the electrodes of the photomultiplier tube through contact of the cold dry gas with the metal of the tube pins. As there shown, the tube pins 17 and socket plate 16 are so arranged that while electrical contact is made between the pins and the individual sockets in the plate, a portion of the metal of each of the pins is not covered by the plate and is accordingly available for direct contact with the stream of cold dry gas. This arrangement of the pins and socket plate can be effected by a controlled insertion of the pins in the sockets so as to make good electrical contact but leave a portion of each of the pins uncovered. A metal cover plate 20 of conventional design is provided over the socket plate.

In assembling of the photomultiplier tube section as shown in FIGURE 2, an order of setting-up of the parts is followed such as to provide sight-access to the chamber 5 for the purpose of positioning the inner or cold end of the light pipe 14 therein. This order may be effected by arranging the photomultiplier tube, to which the necessary electrical connections have been made, in the annular bracket 6 in the metal can forming part of the chamber 5, and placing this assembly in the larger metal can forming part of the outer shell 3 which has been previously lined with the appropriate section of the thermal insulating material 4, as shown. The chamber 5 is closed by means of the lid or cover therefor, and a section of the thermal insulating material 4 placed over the top of the chamber 5, as shown, and the lid or cover affixed to the shell 3 to complete the assembly. The thickness of the layers of the thermal insulating material is so chosen as to most effectively hinder transfer of heat to the chamber 5.

In the emission spectrometer of FIGURE 3 which illustrates the use of a photomultiplier tube section and light tube in accordance with the invention, the emitted-light section comprises a pressure cell for holding a specimen for excitation to emit light while under a predetermined applied pressure for shift of the emission spectrum, and a monochromator arranged to receive emitted light from the specimen for selection of a narrow waveband of the light. Light of a higher energy level than that emitted by the specimen may be used for excitation of the specimen. The pressure cell may be of the type described by Fitch, Slykhouse and Drickamer in J. Opt. Soc. Amer. 47, 1015 (1957). The monochromator may be of the grating type and have an exit slit collective lens. The emitted light selected by the monochromator is transmitted by the light pipe to a photomultiplier tube section of the construction as shown in FIGURE 1 where it falls on the photocathode of the photomultiplier tube which is operated at low temperature by flow of cold dry gas through the cold chamber holding the tube. The photomultiplier tube is connected to a suitable voltage source, not shown, and to an electrometer for measuring the signal current developed in the tube in response to the incident emitted light.

A metal tube 21 is attached to the monochromator about the exit slit and of a diameter to receive the metal tube 15 on the photomultiplier tube section in telescoping relationship to form an ambient light shield of adjustable length about the light pipe as shown. This arrangement allows adjustments to be made to compensate for changes in the focus of the exit slit collective lens of the monochromator due to changes in wavelength of the selected emitted light.

The light pipe may be a rod of an appropriate light transmitting material which, preferably, also, is selected on the basis of a low coefficient of expansion whereby to retain a close fit between the light pipe and the opening into the cooling chamber of the photomultiplier tube section for minimizing heat leakage into the cooling chamber. Fused quartz and Pyrex glass are materials of low coefficient of expansion which transmit in the ultraviolet region; fused quartz over the whole of the ultraviolet and Pyrex glass over the near ultraviolet. The diameter of the light pipe may be varied and depend upon the beam spread of the emitted light to be transmitted. With the use of a collecting lens at the exit slit of the monochromator, a diameter of about one-half inch for the light pipe will generally suffice. The length of the light pipe to satisfy the condition that the dew point or transition temperature shall not occur at the entrant face of the light pipe can be determined for any low operating temperature in the cold chamber of the photomultiplier tube section by simple trial and error. As a practical matter, an overall length of light pipe, of about six inches will generally suffice for the purpose when the warm terminal of the light pipe is at room temperature and the cold terminal thereof, in the cold chamber, is at a temperature as low as about $-200°$ C.

A preferred cooling gas for operation of the photomultiplier tube at low temperatures is cold dry air, preferred from the standpoint of cost and availability, although cold dry nitrogen or argon may also be used. The cold dry air may be prepared by passing air under light compression through an elongated cylindrical container in indirect heat-exchange with liquid nitrogen whereby the water and other contaminents are separated from the refrigerated air and trapped in the container. With the use of liquid nitrogen, the air can be refrigerated to a temperature of $-180°$ C.

For obtaining a deep reduction in dark current the photomultiplier tube should be operated at temperatures of from about $-100°$ C. to $-180°$ C. and lower. However, the photomultiplier tube may be operated at higher sub-zero temperatures, for example, in the range of from about $-40°$ C. to $-80°$ C. with a substantial reduction in the development of dark current. As the term low temperature is used herein with reference to the operation of the photomultiplier tube, is meant temperatures which lie substantially below zero centigrade, for example, those appearing herein above.

The capacity of the photomultiplier tube section of the invention to operate to cool the photomultiplier tube to low temperatures at which the emission spectrometer of which it is a part can measure very low levels of light is demonstrated by a study of the emission spectra of thallium and lead activated sodium chloride phosphors, NaCl(Ti) and NaCl(Pb), and their shifts as a function of pressure using an emission spectrometer as shown in FIGURE 3. In the emission spectrometer, so used, a Bausch and Lomb 250 mm. grating type monochromator having a collective lens at the exit slit was arranged in conventional way to receive light emitted from the excited phosphor sample in the pressure cell. A light pipe in the form of a rod of fused quartz, ½" x 6", was arranged in the telescoping metal tube shields to transmit the light of narrow waveband from the monochromator to the photomultiplier tube section to fall on the photocathode of a 1P28 photomultiplier tube (9 dynodes) operating in the cooling chamber at $-180°$ C. by means of cold dry air (liquid nitrogen cooled) flowing through the cooling chamber under light compression. At $-180°$ C., the dark current of the photomultiplier tube was reduced from the room temperature level of $5 \times 10^{-9}$ amperes to less than about $1 \times 10^{-12}$ amperes, a 1000 fold reduction, and with no frost accumulation on the light-entrant face of the light pipe, allowing measurement of the signal currents of the tube generated by the incident light from the phosphor emission, which signal currents were of the order of from $3 \times 10^{-9}$ to $3 \times 10^{-10}$ amperes.

Since the invention herein described may be variously practiced without departing from the spirit and scope thereof, it is to be understood that the specific embodiment appearing in the above description shall be taken by way of illustration and not in limitation except as may be required by the appended claims.

What is claimed is:
1. An emission spectrometer comprising in combination,
   means for holding a specimen for excitation to emit light,
   means for selecting a narrow waveband of light from the light emitted by the specimen,
   means for receiving light from said light selecting means and generating a signal current in response thereto including a photomultiplier tube having metal terminal pins,
   means for connecting the photomultiplier tube to means for measuring the signal current thereof and to a voltage source,
   said connecting means including a pin socket plate adapted to receive the metal terminal pins of the photomultiplier tube for separate electrical contact therewith and to leave a portion of each of the pins uncovered,
   means for housing the photomultiplier tube for operation at low temperatures when assembled to said pin socket plate including a cooling chamber having means for mounting the photomultiplier tube and assembled pin socket plate therein in spaced relation to the walls of said chamber.
   said cooling chamber having inlet means and outlet means for flow of cold dry gas therethrough and over the photomultiplier tube and assembled pin socket plate mounted therein,
   means for transmission of light from said light selecting means to the photocathode of the photomultiplier tube in said cooling chamber including a light pipe adapted to extend from said light selecting means into said cooling chamber and of a length to place the occurrence of a temperature gradient in the light pipe at a point removed from the light-entrant face thereof,
   and means for measuring the signal current of the photomultiplier tube.

2. An emission spectrometer as defined in claim 1, wherein the means for holding the specimen for excitation to emit light is adapted for applying a predetermined pressure to the specimen under excitation.

3. An emission spectrometer as defined in claim 2, wherein the means for selecting a narrow waveband of light is a monochromator.

4. An emission spectrometer as defined in claim 2, wherein the means for selecting a narrow waveband of light is a grating monochromator having a collective lens at the exit slit and the light pipe transmits in the ultraviolet region.

5. An emission spectrometer as defined in claim 1, wherein the means for selecting a narrow waveband of light is a monochromator.

6. An emission spectrometer comprising in combination,
   means for holding a specimen for excitation to emit light and applying a predetermined pressure to the specimen while under excitation,
   a grating monochromator having a collective lens at the exit slit for selecting a narrow waveband of light from that emitted by the specimen,
   means for receiving light from said monochromator and generating a signal current in response thereto including a photomultiplier tube having metal terminal pins,
   means for connecting the photomultiplier tube to means for measuring the signal current thereof and to a voltage source,
   said connecting means including a pin socket plate adapted to receive the metal terminal pins of the photomultiplier tube for separate electrical contact therewith and to leave a portion of each of the pins uncovered,
   means for housing the photomultiplier tube for operation at low temperatures when assembled to said pin socket plate including a cooling chamber having means for mounting the photomultiplier tube and assembled pin socket plate therein in spaced relation to the walls of said chamber,
   said cooling chamber having inlet means and outlet means for flow of cold dry gas therethrough and over the photomultiplier tube and assembled pin socket plate mounted therein,
   means for transmission of light from said monochromator to the photocathode of the photomultiplier tube in said cooling chamber including a fused quartz light pipe adapted to extend from said monochromator into said cooling chamber and of a length to place the occurence of a temperature gradient in the light pipe at a point removed from the light-entrant face thereof,
   and means for measuring the signal current of the photomultiplier tube.

References Cited
UNITED STATES PATENTS

| | | | |
|---|---|---|---|
| 2,567,036 | 9/1951 | Shannon | 250—227 |
| 3,227,885 | 1/1961 | Hirai et al. | 250—238 |
| 3,179,802 | 4/1965 | Hall | 250—238 |

RALPH G. NILSON *Primary Examiner.*

J. D. WALL, *Assistant Examiner.*